Dec. 28, 1965   R. W. McKINLEY   3,226,129
VEHICLE AND DEFORMABLE WHEEL THEREFOR
Filed Nov. 4, 1963   5 Sheets-Sheet 1

INVENTOR.
BY ROBERT W. McKINLEY
ATTORNEY

Dec. 28, 1965   R. W. McKINLEY   3,226,129
VEHICLE AND DEFORMABLE WHEEL THEREFOR
Filed Nov. 4, 1963   5 Sheets-Sheet 2

INVENTOR.
ROBERT W. McKINLEY
BY
ATTORNEY

Dec. 28, 1965  R. W. McKINLEY  3,226,129
VEHICLE AND DEFORMABLE WHEEL THEREFOR
Filed Nov. 4, 1963  5 Sheets-Sheet 3

INVENTOR.
ROBERT W. McKINLEY
BY
*Richard W. Hanse*
ATTORNEY

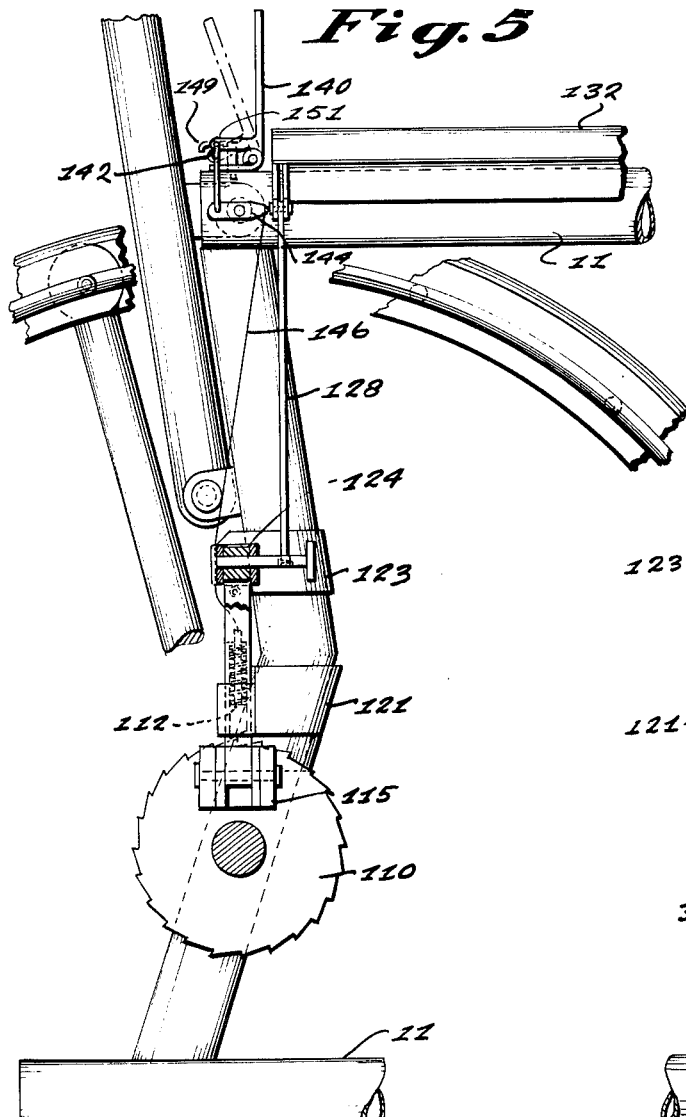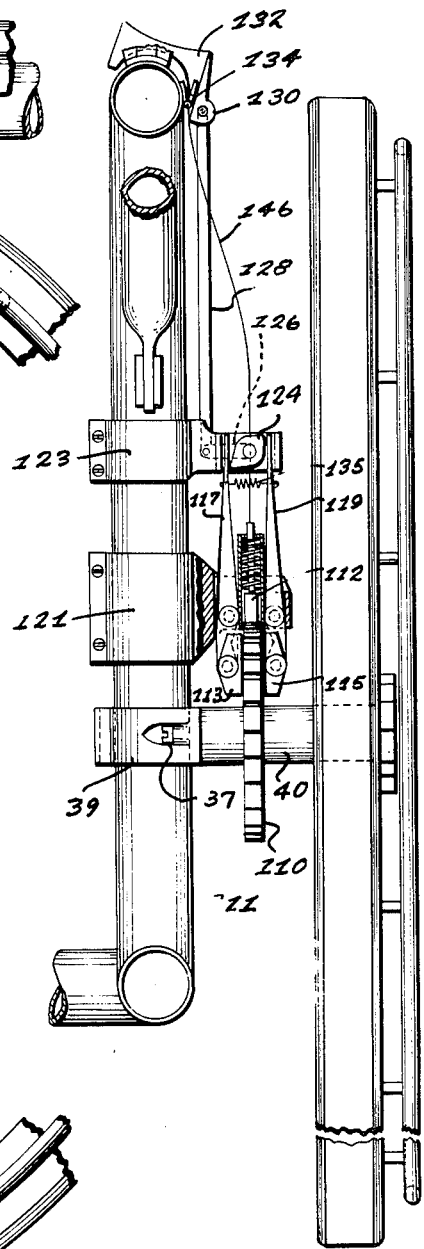

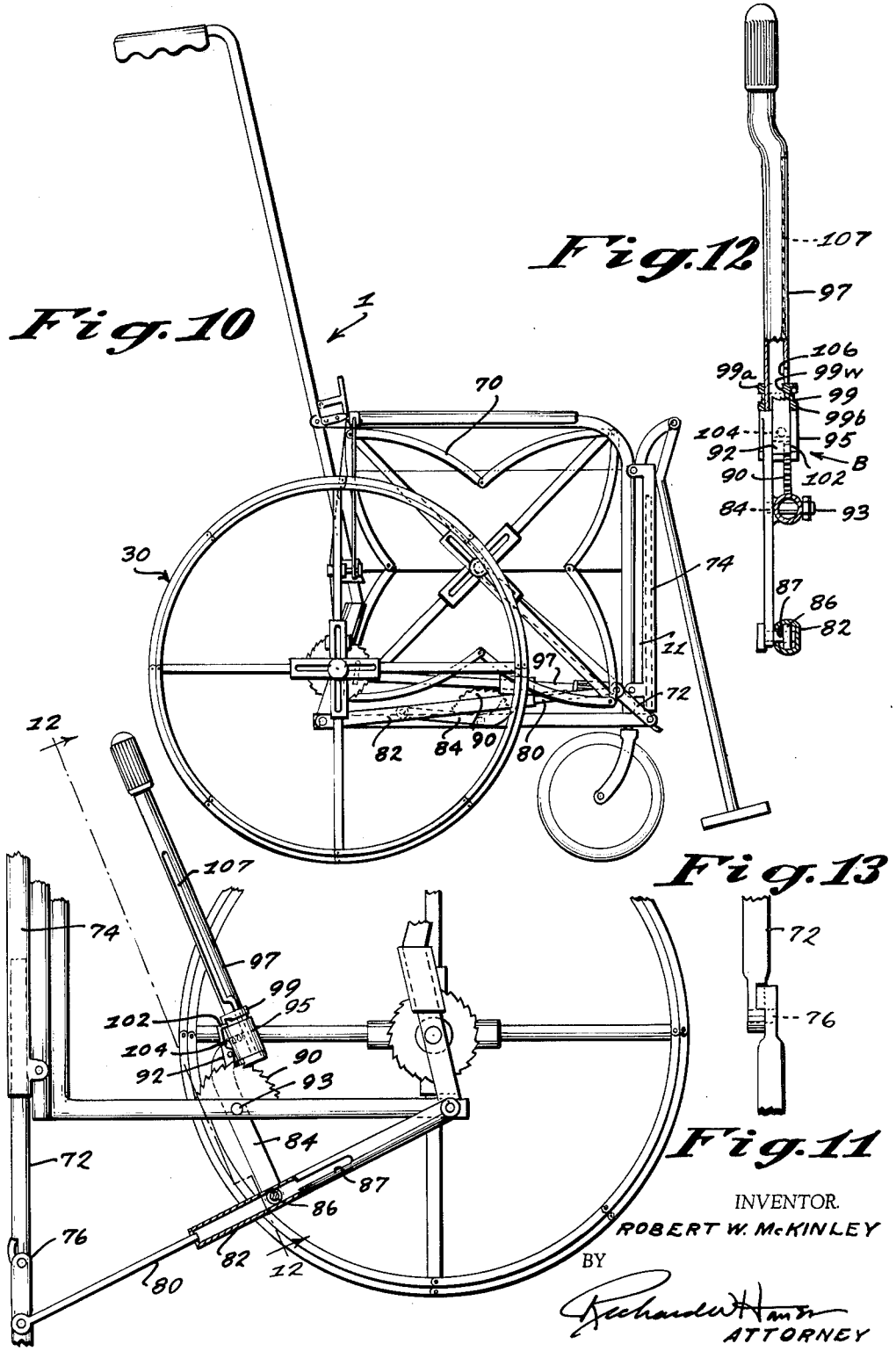

United States Patent Office 3,226,129
Patented Dec. 28, 1965

3,226,129
VEHICLE AND DEFORMABLE WHEEL
THEREFOR
Robert W. McKinley, 1104 Rosemont Drive,
Security, Colo.
Filed Nov. 4, 1963, Ser. No. 321,006
7 Claims. (Cl. 280—5.2)

The present invention relates to vehicles of the type generally referred to as single passenger wheel chairs and more specifically to such a vehicle adapted to climb and descend stairs curbings and other such obstacles.

Much effort has been expended in the past to provide handicapped persons with reliable transportation which can make them independent of attendants or special structural features in the buildings in which they live and work. Wheel chairs have, in large measure, filled this need but conventional chair design is substantially limited to travel over a smooth surface, it being impossible to easily ascend or descend stairs with any degree of safety. This particular problem has been attacked on many fronts but a thoroughly workable solution apparently is yet unachieved. Several stringent criteria exist for a practical and usable design, not the least of which are cost and safety requirements. With this background in mind it is the primary object of the present invention to provide a single passenger vehicle capable of negotiating a series of steps or stairs and which performs with ease and efficiency on flat surfaces.

A further object of the invention is to provide climbing structure adapted to be interchanged with the conventional wheel structure of an ordinary invalid chair.

A still further object of the present chair construction is to retain all of the desirable structural and operating characteristics of a conventional wheel chair, such as weight, turning radius, collapsibility, carrying capacity and critical dimensions, while at the same time providing a climbing ability with "fail safe" features.

Another object of the invention is to achieve a design and construction which is mechanically simple and reliable, characterized by a very minimum of operating maintenance and low initial cost.

Another object of the invention relating directly to the climbing apparatus is the provision of a chair which can be manually operated, controlled and propelled, while at the same time lending itself to the economical inclusion of powered propulsion and control means.

How these and other features and advantages are implemented will become apparent as the description of an exemplary chair structure proceeds.

In accordance with the present invention a chair frame is equipped with a pair of rotatable driving wheels normally circular in shape but which are deformable to substantially conform to the contour of a step or the like. The chair is further provided with running gear, such as castors, a front stabilizing means for use in climbing and descending stairs and a descent control mechanism operatively associated with the driving wheels.

The details of the preferred construction of the invention together with a description of one modified version of the descent control mechanism will be set forth in the following specification taken in conjunction with the accompanying drawings in which:

FIGURE 5 is an enlarged detail of the wheel showing the braking and descent control.

FIGURE 6 is a rear view of the wheel shown in FIGURE 5.

FIGURE 10 is a side elevational view of the wheel chair and the front stair climbing wheel attachment in a retracted position.

FIGURE 11 is a partial detail of the extension mechanism of the wheel.

FIGURE 12 is a detail view partially in section along lines 12—12 of FIGURE 11.

FIGURE 13 is a detail view of the locking mechanism of the supporting structure.

The chair and its operation

Figures 1, 5A:
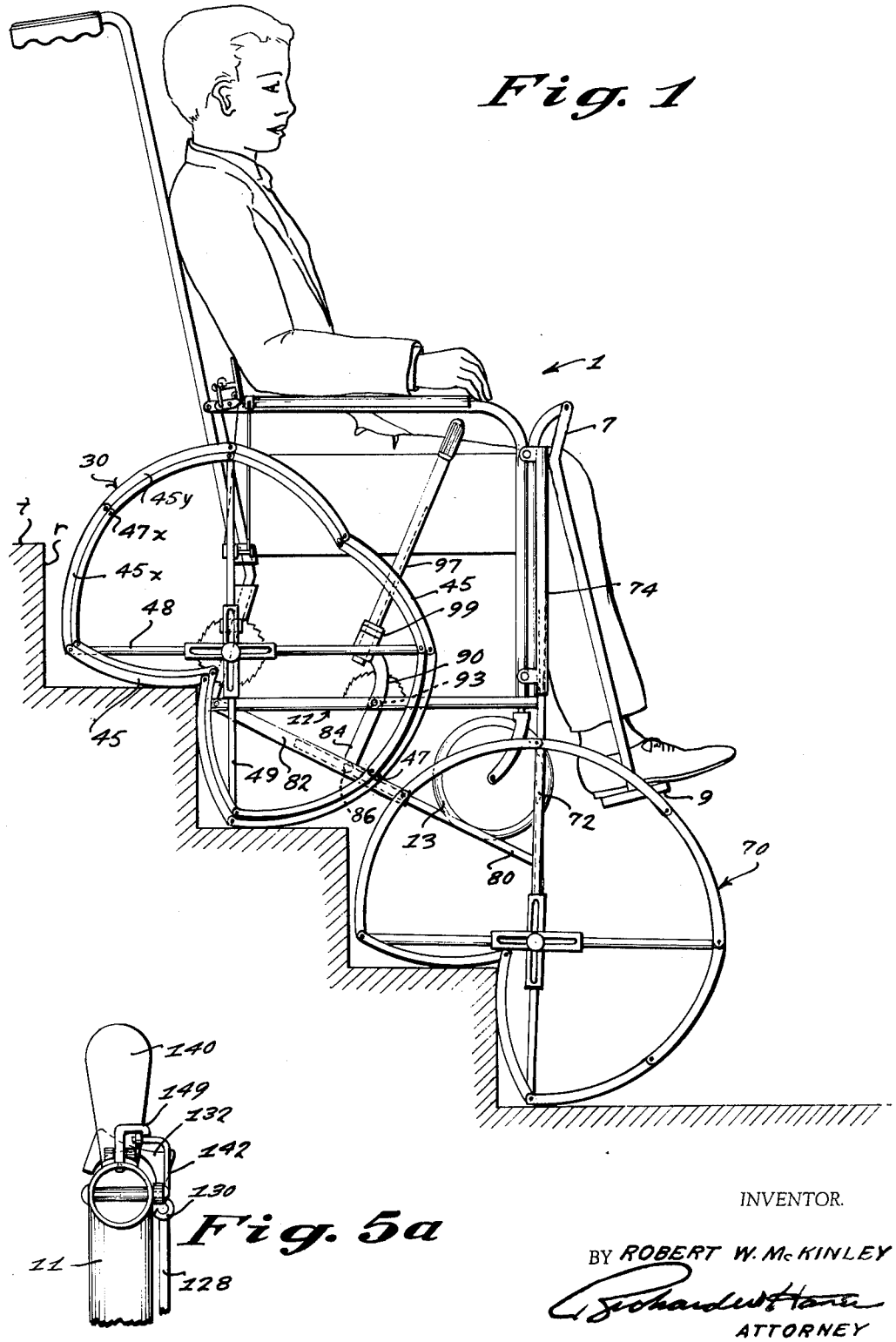
FIGURE 1 is a side elevational view of the wheel chair with the front stair climbing wheels fully extended.
FIGURE 5a is a rear view of the arm rest control shown in FIGURE 5.
Figure 2:
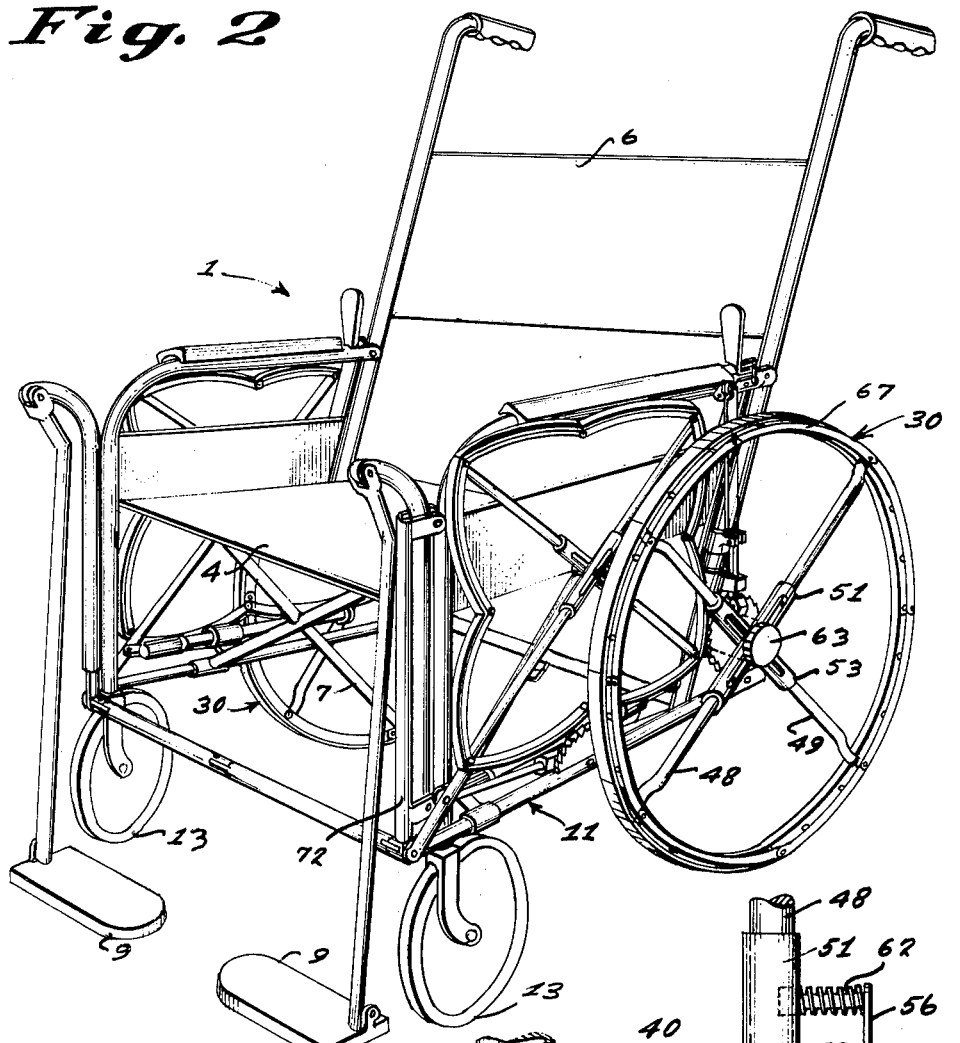
FIGURE 2 is a perspective view of the wheel chair with the front stair climbing wheels retracted.

General views of the wheel chair of the present invention are seen in FIGURES 1 and 2 of the drawings. The chair, referred to generally by reference numeral 1 is of a substantially conventional tubular frame construction supporting flexible seat and back member 4 and 6 respectively. Suitable lateral bracing struts 7 interconnect the sides of the chair and are pivotably mounted and hinged at their centers to allow the chair to be collapsed laterally for compact storage or hauling. Also integral with the frame structure are a pair of depending foot rests 9 which are pivotably mounted for rotation to a more conveniently storable position when the chair is not in use. Mounted at the front lower corners of the frame 11 are two spaced apart casters 13 which are conventional in all respects and are attached to the frame structure by means well known in the art.

Figure 8:
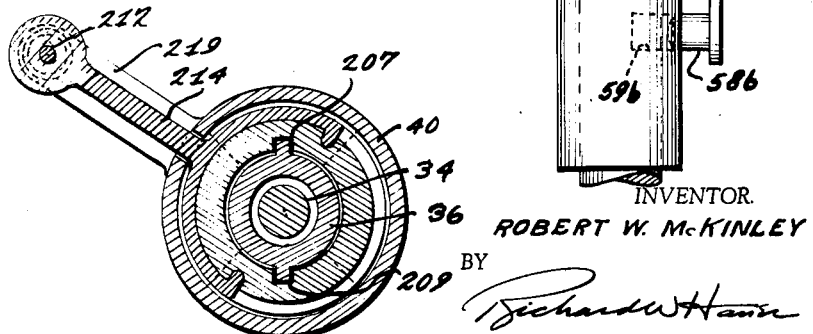
FIGURE 8 is a detailed section along lines 8—8 of FIGURE 7.

The rear support of the vehicle is provided by two relatively large driving wheels, generally referred to by the reference numeral 30. Each of these wheels is mounted by a plurality of annular bearings 32 which receive their support from a cantilever axle 34 welded or otherwise secured to a portion of the tubular frame 11, as best seen in FIGURE 8. Actually the bearings 32 are not in contact with the axle 34 because the use of a cylindrical sleeve 36 between the axle 34 and the bearings 32 enhances the aspect of wheel interchangability and provides a platform for the particular embodiment of the descent control mechanism pictured in FIGURE 8, which will be explained more fully later in the disclosure. The frame abutting end of the sleeve 36 is in the form of a circular flange 36f which is adapted to receive the threaded end of a screw fastener 37. The opposite end of the bore of sleeve 36 is threaded to engage the threads 38 on the outward end of the axle 34 thereby connecting the sleeve 36 to the axle. Once the sleeve is screwed onto the axle it is locked against further rotation by a circular hinged clamp 39 which surrounds the tubular frame portion 11 and is attached to the circular flange 36f by a pair of screw fasteners 37. Thus, it is seen that a conventional type wheel may be interchanged with the deformable driving wheel 30 of the present invention by merely removing the locking clamp 39 from the frame, unscrewing the sleeve 36 from the threaded axle 34 and reversing the operation for the installation of a new wheel. The center of the driving wheel, either conventional or deformable, has an inwardly extending integrally formed hub 40 which is pressed onto the outer race 32r of the wheel bearings 32, thus forming a complete unit with the sleeve 36. A nut 41 threaded onto the outer end of the sleeve 34 serves to hold the bearings in position on the sleeve.

Figure 4:
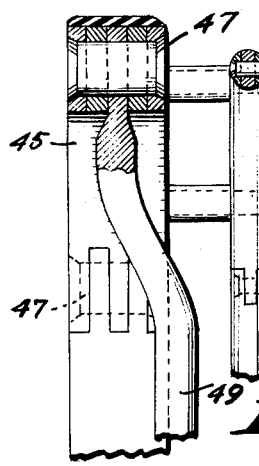
FIGURE 4 is an enlarged detail of a driving wheel partially in section taken on line 4—4 of FIGURE 3.
Figure 3:
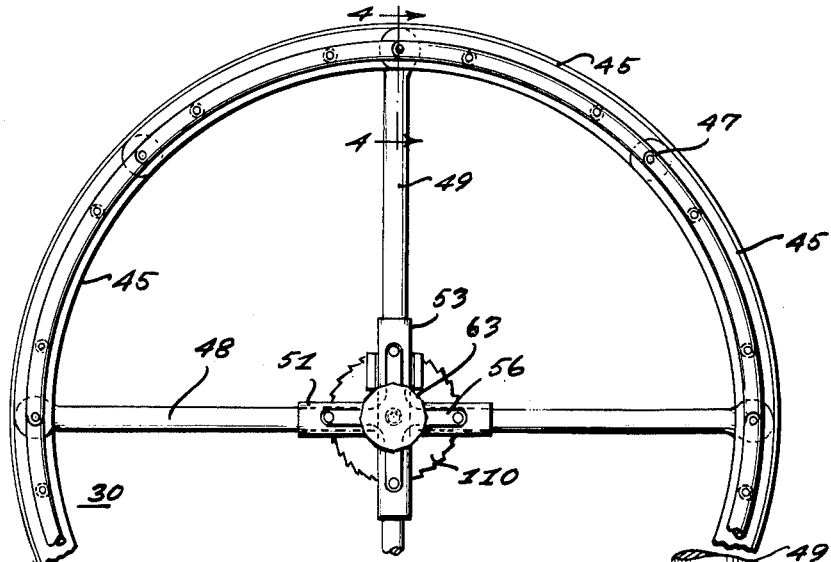
FIGURE 3 is a detailed partial view of one of the driving wheels of the wheel chair.

Referring now to the functional aspects of the driving wheel 30, it will be noted that the wheel is adapted for both a normal and deformable mode of operation. For travel over flat surfaces the wheel assumes a normal circular configuration, however, when steps, curbs or the like are to be negotiated, a slight mechanical alteration of a locking means transforms the wheel rim into a deformable support which substantially conforms to the contour of the step to which it is applied. Actually, a normal driving wheel can be made to move from the thread of one step to the next if sufficient friction is present at the point contact between the wheel surface and the stair riser to get the "grip" necessary to hold the wheel when it is rotated and thereby lift the chair. However, with the deformable wheel 30 this "grip" is amply furnished by an arc 45 of the wheel rim. Considering the desired dimension of a wheel chair driving wheel and the dimensions of a standard step it has been found that satisfactory climbing results are obtained by dividing the wheel rim into eight separate arcs, much as the arc 45, already referred to. Each of the arc portions are hinged together by a pin 47, or other suitable hinge, which enables the arc portions to be pivotal with respect to each other. A pair of perpendicular slide bars 48 and 49 are connected at each of their ends to the rim at every other rim pivot point 47. (See FIGURE 4 for the details of the slide bar connection.) If the slide bars bisect each other and are fastened in such a manner as to maintain such a position, each half of the slide bars 48 and 49 forms a radius of a circle and the pivotal rim arcs are firmly held in a circular pattern, thus forming a normal driving wheel. However, if the slide bars are permitted to move with respect to each other the various rim arcs then become pivotal. FIGURE 3 of the drawings depicts the wheel 30 in normal configuration with the cross slide bars 48 and 49 locked in a mutually bisecting position. When the slide bars are unlocked the rim arcs 45 are free to pivot in response to a force directed thereagainst (such as the pressure of a stair riser against the surface of one of the arcs). As will be apparent from viewing FIGURE 1 of the drawing, the collapse of a portion of the wheel rim as the chair is backed up to the step to be ascended creates an indentation in the wheel which fits over the step to be climbed, establishing that portion of the rim resting on the upper step tread as a solid base from which a lifting force may be exerted. After the wheel has attained the positions shown in FIGURE 1 continued backward rotation of the wheel will bring the next arc segment 45x into contact with the next stair riser r and the pivoted joint 47x will move inwardly permitting the next arc piece 45y to lie down on the next stair tread t. Thus, it is seen that continued backward rotation of the driving wheels, either by the occupant's manual operation or by suitable power means connected to the wheels (not shown) results in a stair climbing sequence.

The same theory of operation applies to a descent of the stairs and the apparatus which prevents an accidental descent when climbing is used for controlling the purposeful descent and will be explained in detail later in the disclosure.

To understanding the preferred method for locking the slide bars 48 and 49 reference is made to FIGURES 3 and 8 particularly. A framework is constructed of two tubular guide sleeves 51 and 53 welded to each other at right angles and attached rigidly to the wheel hub 40 so that the axis of the hub is perpendicular to the parallel planes in which the sleeves 51 and 53 lie. The guide sleeves are positioned so as to bisect one another at a point lying on the longitudinal axis of the hub 40. The slide bars 48 and 49 fit within the guide sleeves 51 and 53 respectively with enough clearance so as to be easily slidable therein.

A locking fixture 55 is mounted on the crossed guide sleeves for interlocking the slide bars into a fixed position and comprises a framework 56 of four crossed members which extend part way over each of the guide sleeves. Extending from the outer end of each leg of the framework 56 are projecting pins 58a and 58b which are sized and positioned to extend into aligned detents 59a and 59b in the corresponding slide bar when the slide bars are centered. At the center of the framework 56 a threaded shaft 61 is engaged in a projecting stud 62 and when rotated by a knob 63 projecting over the framework 56, the knob contacts the legs of the framework and forces the pins 58a and 58b into the detents 59a and 59b in the slide bars 48 and 49 respectively. When the knob 63 is oppositely rotated a pair of spiral springs 65 surrounding the long pins 58 and disposed between the guide sleeve 51 and the fixture framework 56 force the locking pins out of the detents and the slide bars become free to move with respect to one another.

A segmented hand rail 67 is attached to the outside edge of the wheel rim for manual propulsion of the vehicle. As seen best in FIGURE 4 the band rail is also articulated to follow the movements of corresponding portions of the wheel rim.

Front climbing wheels

During ascent or descent of stairs the chair must be kept level or at least prevented from tipping forward to spill the occupant therefrom. Since the front pair of casters 13 cannot touch the stair from a level chair position a second pair of deformable wheels 70 are extended from each side of the vehicle to give the required front support and balance, while in normal operation upon level surfaces the front support wheels are stored alongside the chair body, as shown in FIGURE 2. Each of the front support wheels 70 is carried by a cooperating combination of telescoping and pivotal members which function to extend and lower the front wheels 70 into a desired position depending on whether an ascent or descent of the stairs is planned. Obviously the wheels 70 must gradually assume their fully lowered position, as shown in FIGURE 1, as the chair progresses from its position on the bottom landing upward along the first few stairs. Conversely, the wheels 70 must be fully extended and lowered onto the stairs immediately below an upper landing before undertaking a descent. The structure for achieving this operation will be described for only one of the wheels since both are alike in their construction and operation.

The wheel 70 is rotatably mounted on one end of an extensible strut 72 whose other end is slidably disposed in a rigid cylinder 74 vertically mounted on a forward vertical portion of the wheel chair frame 11. Approximately at its mid-point the strut 72 is divided and provided with an offset hinge 76 so that the lower wheel carrying portion of the strut can be folded back more than 180° from its fully extended position to store the wheel at the side of the chair, as shown in FIGURES 2 and 10. The extent of vertical reach required by the wheel is a variable and depends on the type of stair being negotiated or the position on the stair with respect to a landing. The strut 72 is designed to accommodate those variables by being retractable and extensible within the housing cylinder 74 and at the same time being adapted to bend at the hinged joint 76. These movements of the strut 72 are controlled by a reciprocably movable actuator piston 80 pivotally connected to the foldable portion of the strut 72 at a point intermediate the hinge 76 and the wheel mounting point. The piston 80 is telescoped into a tubular chamber 82 which is pivotally mounted to the lower rear portion of the chair frame. The strut 72 is positioned by the rotation of the piston chamber 82 and the extension or retraction of the piston 80 which may be controlled by various means known to the art, such as hydraulics or pneumatics, but is preferably controlled by a mechanical ratchet system which is believed to afford the maximum in safety of operation for the lowest cost.

In the embodiment shown in FIGURE 11 the movement of the piston 80 and its housing chamber 82 are controlled by a pivoted lever arm 84 operably connected to the housing chamber 82 by a flanged roller 86 protruding into the hollow interior of the chamber 82 through a longitudinal slot 87 in the inner side of the chamber 82. The roller 86 is positioned behind the piston 80 and acts to extend the piston when the lever arm 84 is rotated. When the lever arm 84 is held in any one position the remaining structure is also locked in position due to the fact that any movement whatever of the strut 72 depends on a rotational movement of the piston 80 and its housing chamber 82.

The structure of the lever locking apparatus comprises a semicircular ratchet wheel 90 which cooperates with a pivotal pawl 92 mounted on the lever arm 84 to prohibit the lever from rotating in response to the upwardly directed forces exerted on the wheel 70 and strut 72 by the weight of the chair and its occupant. As best seen in FIGURES 11 and 12 the lever arm 84 is connected to a horizontal frame member of the chair by a pin 93 and the ratchet wheel 90 is welded to the same member directly above the pivot point of the lever arm. At its upper end the lever arm 84 is provided with a mounting collar 95 with which to hold a cylindrical handle 97. The handle 97 is grasped by the occupant of the chair and pivoted to change the position of the front support wheel 70 as the requirement therefor changes, as previously explained. It is, however, necessary that for each position of the wheel 70 the chair must receive firm support without physical exertion from the occupant. Since the support is obtained through the front wheel structure and the aforementioned ratchet lock, positive action is necessary to unlock the lever arm and move it to a new position. In the preferred embodiment of the present invention the ratchet is unlocked by rotation of the handle 97 which functions to rotate a camming collar 99 which surrounds the handle and abuts against the top surface of the handle mounting collar 95. The camming collar has top and bottom spaced apart flanges 99a and 99b between which protrudes a notched lip 102 of the pivoted ratchet pawl 92. The lower surface of the top flange 99a is inclined to form a camming surface which forces the pawl 92 clockwise about its pivot when the camming collar 99 is rotated in such a direction that the pawl lip 102 moves down the incline of the flange surface. When the handle is pushed forward concurrently with the rotation of the handle the point of the pawl will be removed from the interdental spaces of the ratchet teeth and the handle will then be free to move in either direction. To lock the handle at a new position the handle is rotated back to normal position and a biasing spring 104 forces the pawl counterclockwise to insure its locking engagement with the teeth.

By examination of the drawings it will be seen that the normal forces exerted on the wheel 70 will tend to cause the strut to pivot outwardly at its hinge 76, thus raising the outer end of the housing chamber 82, which would tend to rotate the lever arm 84 counterclockwise about its pivot. This movement is, of course, prevented by the pawl 102 and ratchet 90 unless the pawl is released from the ratchet teeth, as described above. Such a system as just described is fail safe because positive action must be exerted to change or alter the position of the wheels; failure to twist or move the handle will only result in a continuous locked condition which assures support of the front end of the wheel chair.

The operation of the front wheels is best done in increments after each stair is ascended or descended until the front wheels are fully extended and no further adjustment is required. It should be pointed out that the handle 97 is provided with an offset elongation 107 of the slot 106 into which the collar wedge 99w fits for turning the collar. Thus, when the wheel is pulled up by hand into its storage position beside the chair, the handle 97 can be more conveniently positioned by sliding the handle down through the collars when the collar wedge 99w is guided past the offset stop and into the elongated portion 107 of the handle slot.

*Descent control and braking*

Figure 9:
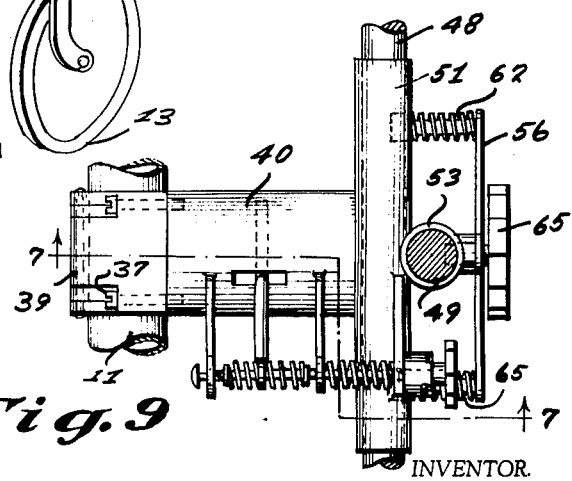
FIGURE 9 is a detail of the manually operated control shown in FIGURE 7.
Figure 7:
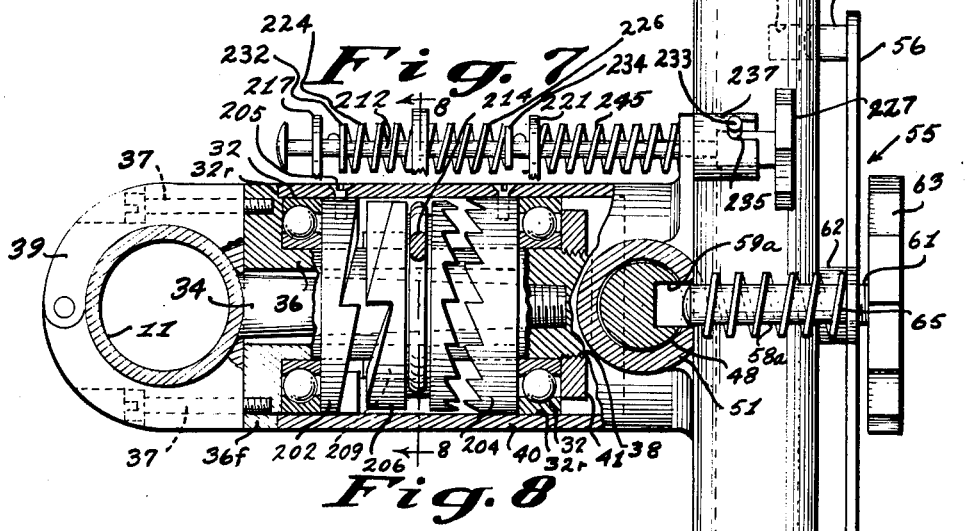
FIGURE 7 is a view partially in section taken along lines 7—7 in FIGURE 9.

Braking and control of the descent of the wheel chair is of utmost importance because herein lies the safety of the occupant. The preferred embodiment of the descent control and braking mechanism is shown in FIGURES 2, 5, 5a and 6. An alternative embodiment is illustrated in FIGURES 7, 8 and 9 and will be described later. In the interest of safety and the absolute control of descent a combined dual system of braking and incremental wheel locking is provided wherein the contour wheels are released from an automatic lock at chosen intervals and a brake system controls the speed of travel during the said increments.

Rigidly mounted on each of the wheel hubs 40 is a ratchet wheel 110 which, when engaged by an independently mounted spring urged reciprocally movable dog 112, locks the wheel against forward or downstair motion, while at the same time permitting backward rotation of the wheel. Before explaining the operation of the locking dog 110 it will be noted by reference to FIGURES 5 and 6 that a pair of oppositely disposed friction brake shoes 113 and 115 are attached to a pair of pivotally mounted lever arms 117 and 119 respectively and are thus adapted to bear against the flat side surfaces of the ratchet wheel to slow the rotation thereof. Both of the mounting lever arms are mounted by a bracket 121 fastened to the frame 11 of the wheel chair. A second bracket 123 also mounted on the chair frame 11 carries a rotatable generally elliptically shaped cam 124 positioned between the two upper ends of the shoe mounting lever arms 117 and 119. Referring to FIGURE 6 it is evident that as the cam is made to rotate clockwise the upper ends of the lever arms are spread, while the lower ends are brought toward each other to bear against the ratchet wheel.

The braking cam 124 derives its rotation through a crank arm 126 and connecting rod 128 which is fastened to a protruding ear 130 of the rockable arm rest 132. The arm rest 132 is mounted on a horizontal chair frame member by means of a piano hinge 134 secured along one side of the arm rest member 132. Downward pressure of the occupant's arm will partially rotate the arm rest about its pivotal mounting, thus imparting a clockwise rotation to the braking cam 124 when the connecting rod 128 is raised. A biasing tension spring 135, interconnecting the top ends of the braking lever arms 117 and 119 exerts a constant force on the lever arms which tends to rotate the cam 124 counter-clockwise and restore the arm rest to a nonbraking position.

Aft of the rockable arm rest 132 a locking ratchet control push plate 140 is hingedly attached to the chair frame. The push plate, when pressed rearwardly by the occupant's upper arm, acts through an appropriate push rod 142 and crank arm 144 to raise the ratchet locking pawl 112 to permit forward rotation of the contour wheels 30. As long as the push plate 140 is held rearwardly the chair is free to move downstairs, and speed control may be maintained by varying the downward pressure on the arm rests 132. When rearward pressure on the push plate 140 is released a pawl biasing spring 147 seats the pawl on the ratchet wheel 110 and further forward rotation of the wheel 30 is prevented.

When in operation upon a flat surface it is desirable that the wheel locking apparatus be inoperative to avoid the necessity of constant back pressure on the push plate 140. Although many devices would be acceptable to accomplish such a result, a simple turn lock 149 is attached to the frame 11 which can be manually rotated into the path of the horizontal arm 151 of the push plate after the plate has been deflected rearwardly, thus preventing the normal return of the plate to its upright position.

A modified form of the ratchet control mechanism is illustrated in FIGURES 7 and 8. A pair of spaced apart ring members 202 and 204 are positioned upon the wheel spindle 36 between the wheel bearings 32. Each of the ring members has a smooth peripheral surface which contacts the inside surface of the wheel hub 40 and each of the rings is secured thereto by screws 205 or other convenient means. The outer circular surfaces are flat but the inner facings of the rings are cut with ratchet teeth, the one ring 202 having half as many ratchet teeth as the other opposite ring 204. Intermediate the two spaced apart rings 202 and 204 is a longitudinally movable cylindrical ratchet member 206 whose two circular faces are formed to mate with the ratchet teeth of the opposing ring member. A pair of raised beads 207 and 209 on the spindle 36 which fit into complementary notches on the inside of the cylindrical ratchet member keep the ratchet member from rotating on the shaft. When the ratchet member 206 is moved longitudinally into engagement with either the ring 202 or the ring 204 the wheel 30 is prevented from rotating in a forward direction.

Longitudinal movement of the ratchet member 206 is controlled by a push-pull rod 212 and a yoke 214 whose stem is slidably secured to the push-pull rod inwardly from the rod's end. As the rod is reciprocated the bifurcated end of the yoke 214, which is disposed in a peripheral groove 216 on the ratchet member 206, exerts a force on the ratchet member which changes its position as desired.

The push-pull rod is mounted by a pair of hub extensions 217 and 221 and normally maintained in a central, nonengaging position by a pair of centering springs 224 and 226 which surround the rod 212 and are compressed between the yoke 214 and a pair of washers 232 and 234. By pulling or pushing the handle 227 attached to the outer end of the rod 212 the central ratchet member 206 may be engaged with the desired ring member 202 or 204, depending on the extent of forward moving freedom desired. A well known pin and slot combination maintains the rod in either of its extreme positions against the pressure of a centering spring 245 until it is desired to release it and proceed freely or to the next ratchet tooth only. The pin 233 protrudes from the hub of the handle 227 and a cooperating slot 235 is provided in a fixed collar 237 secured to one of the guide sleeves 51.

I claim:
1. a wheel adapted for travel upon stairs, including;
an articulated rim having a plurality of arc shaped rim sections interjoined at their ends and forming a deformable circle;
a pair of mutually perpendicular diametric struts pivotally attached to the rim at diametrically opposed points;
a pair of mutually perpendicular sleeves in which the said two struts are slidably disposed, said sleeves being rigidly interconnected at their longitudinal midpoints;
a hub attached to one of said sleeves; and
locking means mounted on said sleeves for interconnecting the sleeves and struts to prevent relative movement therebetween.

2. A wheel adapted for travel upon stairs, including;
an articulated rim having a plurality of arc shaped rim sections interjoined at their ends and forming a deformable circle;
a pair of mutually perpendicular diametric struts pivotally attached to the rim at diametrically opposed points;
a pair of mutually perpendicular sleeves in which the said two struts are slidably disposed, said sleeves being rigidly interconnected at their longitudinal midpoints; and
a hub attached to one of said sleeves.

3. An occupant controlled and propelled vehicle comprising in combination;
a vehicle frame;
seat means supported by the frame;
a pair of spaced apart drive wheels rotatably attached to opposing sides of the vehicle frame, said wheels each including;
an articulated rim having a plurality of arc shaped rim sections interjoined at their ends and forming a deformable circle;
a pair of mutually perpendicular diametric struts pivotally attached to the rim at diametrically opposed points;
a pair of mutually perpendicular sleeves in which the said two struts are slidably disposed, said sleeves being rigidly interconnected at their longitudinal midpoints;
a hub attached to one of said sleeves;
locking means mounted on said sleeves for interconnecting the sleeves and struts to prevent relative movement therebetween;
a pair of rotatable casters;
swivel means attaching said casters to the front of the vehicle frame;
a pair of opposed stabilizing wheels; and
extensible strut means attached to the front portion of the vehicle frame and rotatably carrying the stabilizing wheels.

4. The vehicle of claim 3 and further including;
at least one ratchet gear secured to the hub of each of said driving wheels;
a pawl carried by the vehicle frame and positioned for engagement with the ratchet gear;
spring means engaging said pawl and normally urging said pawl into engagement with the ratchet gear; and
control means attached to the pawl and adapted to disengage the pawl from the ratchet gear.

5. The vehicle of claim 3 wherein the said stabilizing wheels comprise;
an articulated rim having a plurality of arc shaped rim sections interjoined at their ends and forming a deformable circle;
a pair of mutually perpendicular diametric struts pivotally attached to the rim at diametrically opposed points;
a pair of mutually perpendicular sleeves in which the said two struts are slidably disposed, said sleeves being rigidly interconnected at their longitudinal midpoints; and
a hub attached to one of said sleeves.

6. The vehicle of claim 3 wherein said extensible strut means is articulated and further including;
movable lever means interconnecting the extensible strut means and vehicle frame, whereby movement of said lever means changes the angle of the extensible strut means with respect to the vehicle frame.

7. An occupant controlled and propelled vehicle combination prising in combination;
a vehicle frame;
seat means supported by the frame;
a pair of spaced apart drive wheels rotatably attached to opposing sides of the vehicle frame; said wheels each including;
an articulated rim having a plurality of arc shaped rim sections interjoined at their ends and forming a deformable circle;
a pair of mutually perpendicular diametric struts pivotally attached to the rim at diametrically opposed points;
a pair of mutually perpendicular sleeves in which the said two struts are slidably disposed, said sleeves being rigidly interconnected at their longitudinal midpoints;

a hub attached to one of said sleeves;

locking means mounted on said sleeves for interconnecting the sleeves and struts to prevent relative movement therebetween;

a pair of opposed stabilizing wheels; and extensible strut means attached to the front portion of the vehicle frame and rotatably carrying the stabilizing wheels.

References Cited by the Examiner

UNITED STATES PATENTS

| 3,178,193 | 4/1965 | Grogan | 280—5.22 X |
| 3,179,431 | 4/1965 | Pikl | 280—5.2 |

FOREIGN PATENTS 574,648  3/1958  Italy.

LEO FRIAGLIA, *Primary Examiner.*